United States Patent [19]

Gutzwiller et al.

[11] 3,869,462
[45] Mar. 4, 1975

[54] PROCESSES AND INTERMEDIATES FOR QUININE, QUINIDINE, ISOMERS AND DERIVATIVES THEREOF

[75] Inventors: Juerg Albert Walter Gutzwiller, Bettingen, Switzerland; Milan Radoje Uskokovic, Upper Montclair, N.J.

[73] Assignee: Hoffman-LaRoche Inc., Nutley, N.J.

[22] Filed: Aug. 1, 1973

[21] Appl. No.: 384,767

Related U.S. Application Data

[60] Division of Ser. No. 212,774, Dec. 27, 1971, Pat. No. 3,772,302, which is a continuation-in-part of Ser. No. 164,784, Jan. 7, 1971, abandoned, which is a continuation-in-part of Ser. No. 837,354, June 27, 1969, abandoned, which is a continuation-in-part of Ser. No. 741,914, July 2, 1968, abandoned.

[52] U.S. Cl............................................. 260/288 R
[51] Int. Cl............................................ C07d 33/50
[58] Field of Search ................................ 260/288 R

*Primary Examiner*—Donald G. Daus
*Assistant Examiner*—David E. Wheeler
*Attorney, Agent, or Firm*—Samuel L. Welt; Bernard S. Leon; William G. Isgro

[57] ABSTRACT

The preparation of quinine, quinidine, isomers and derivatives thereof from the correspondingly substituted 4-methylquinoline and 1-acyl(or 1-H)-3-vinyl(or lower alkyl)-4-piperidine acetic acid esters (or acetaldehyde) through alternative series of reaction steps which comprise, condensation, halogenation, deacylation, reduction, cyclization and hydroxylation, is described. Also described is the preparation of 1-acyl(or 1-H)-3-vinyl-4-piperidineacetic acids and esters thereof and 1-acyl-3-vinyl-4-piperidineacetaldehyde utilizing the corresponding 7-acyldecahydro-2H-pyrido[3,4-d]azepin-2-one, prepared from 2-acyl-1,3,4,7,8,8a-hexahydro-6(2H)-isoquinolone. The end products are useful as antimalarial and antiarrhythmic agents.

2 Claims, No Drawings

PROCESSES AND INTERMEDIATES FOR QUININE, QUINIDINE, ISOMERS AND DERIVATIVES THEREOF

CROSS-REFERENCE TO RELATED APPLICATIONS

This is a division of application Ser. No. 212,774 filed Dec. 27, 1971, now U.S. Pat. No. 3,772,302, issued Nov. 13, 1973, which in turn is a continuation-in-part of Ser. No. 104,784, filed Jan. 7, 1971, now abandoned, which is a continuation-in-part of Ser. No. 837,354, filed June 27, 1969, now abandoned, which is a continuation-in-part of Ser. No. 741,914, filed July 2, 1968, now abandoned.

BRIEF SUMMARY OF THE INVENTION

The invention relates to a process for preparing quinine, quinidine, isomers and derivatives thereof which comprises:

a. condensing the correspondingly substituted 4-methylquinoline with racemic or optically active cis or trans 1-acyl (or 1-H)-3-vinyl(or lower alkyl)-4-piperidineacetic acid ester to yield the corresponding racemic or optically active cis or trans 4-{3-[1-acyl(or 1-H)-3-vinyl(or lower alkyl)-4-piperidyl)]-2-oxopropyl}quinoline;

b. deacylating, if necessary, and reducing the product of step (a) to yield the corresponding racemic or optically active epimeric 4-{cis or trans-3-[3-vinyl(or a lower alkyl)-4-piperidyl]-2$\xi$-hydroxypropyl}quinolines. If desired, this reaction product can be acylated to yield racemic or optically active epimeric 4-{cis or trans-3-[3-vinyl(or lower alkyl)-4-piperidyl]-2$\xi$-acryloxypropyl}quinolines or dehydrated to yield racemic or optically active cis or trans 4-{ cis or trans 3-[3-vinyl(or lower alkyl)-4-piperidyl]prop-1-enyl}quinolines;

c. an alternate process comprises condensing the correspondingly substituted 4-methylquinoline with racemic or optically active cis or trans 1-acyl-3-vinyl(or lower alkyl)-4-piperidineacetaldehyde to yield the corresponding racemic or optically active epimeric 4-{cis or trans-3-[1-acyl-3-vinyl(or lower alkyl)-4-piperidyl]-2$\xi$-hydroxypropyl}quinolines, and deacylating this reaction product to yield the corresponding racemic or optically active epimeric 4-{cis or trans-3-[3-vinyl (or lower alkyl)-4-piperidyl]-2$\xi$-hydroxypropyl}quinolines;

d. cyclizing the hydroxy, acyloxy or prop-1-enyl quinoline product of step (b) or (c) to yield the corresponding racemic or optically active 4-{$\alpha$-[5-vinyl(or lower alkyl)-2-quinuclidinyl)-methyl}quinoline, epimeric in positions 2 and 5;

e. hydroxylating the product of step (d) to yield the corresponding racemic or optically active $\alpha$-[5-vinyl(or lower alkyl)-2-quinuclidinyl]-4-quinolinemethanol, epimeric in positions $\alpha$, 2 and 5; and f. recovering the desired reaction product.

An alternate process comprises:

g. halogenating the product of step (a) above to yield the corresponding racemic or optically active epimeric 4-{cis or trans 3-[1-acyl-3-vinyl(or lower alkyl)-4-piperidyl]-1$\xi$-halo-2-oxopropyl}quinolines;

h. reducing the product of step (g) with subsequent cyclization to yield a mixture of the corresponding racemic or optically active epimeric 4-{cis or trans-3-[1-acyl-3-vinyl(or lower alkyl)-4-piperidyl]-1$\xi$,2$\xi$-oxapropyl}quinolines;

i. deacylating the product of step (g) to yield a mixture of the corresponding racemic or optically active epimeric 4-{cis or trans 3-[3-vinyl(or lower alkyl)-4-piperidyl]-1$\xi$,2$\xi$-oxapropyl}quinolines;

j. cyclizing the product of step (h) to yield the corresponding racemic or optically active $\alpha$-[5-vinyl(or lower alkyl)-2-quinuclidinyl]-4-quinolinemethanol, epimeric in positions $\alpha$, 2 and 5; and k. recovering the desired reaction product.

The end products are useful as antimalarial and antiarrhythmic agents.

In another aspect, the invention relates to a process for preparing racemic or optically active cis or trans 1-acyl(or 1-H)-3-vinyl-4-piperidineacetic acid and esters thereof and racemic or optically active cis or trans 1-acyl-3-vinyl-4-piperidineacetaldehyde by:

a. nitrosating a racemic or optically active cis or trans 7-acyl-decahydro-2H-pyrido[3,4-$d$]azepin-2-one to yield the corresponding racemic or optically active cis or trans 7-acyl-1-nitroso-decahydro-2H-pyrido[3,4-$d$]azepin-2-one;

pyrrolyzing the reaction product of step (a) to yield the corresponding racemic or optically active cis or trans 1-acyl-3-vinyl-4-piperidineacetic acid; and c. hydrolyzing, if desired, and esterifying the reaction product of step (b) to yield the corresponding racemic or optically active cis or trans 1-acyl(or 1-H)-3-vinyl-4-piperidineacetic acid ester; and d. reducing and acylating the reaction product of step (c) to yield racemic or optically active cis or trans 1-acyl-3-vinyl-4-piperidineacetaldehyde.

In a further aspect, the invention relates to an alternate process for preparing racemic or optically active cis and trans 1-acyl(or 1-H)-3-vinyl-4-piperidineacetic acid and esters thereof by:

a. alcoholizing a racemic or optically active cis or trans 7-acyl-decahydro-2H-pyrido[3,4-$d$]azepin-2-one to yield the corresponding racemic or optically active cis or trans 1-acyl-3-(2-aminoethyl)-4-piperidineacetic acid esters;

b. methylating the reaction product of step (a) to yield the corresponding racemic or optically active cis or trans 1-acyl-3-(2-dimethylaminoethyl)-4-piperidineacetic acid esters;

c. oxidizing the reaction product of step (b) to yield the corresponding racemic or optically active cis or trans 1-acyl-3-(2-dimethylaminoethyl)-4-piperidineacetic acid ester N-oxide; and d. pyrolyzing the reaction product of step (c) to yield the desired acetic acid and esters thereof.

In still another aspect, the invention relates to a process for preparing racemic or optically active cis or trans 7-acyl-decahydro-2H-pyrido[3,4-$d$]azepin-2-one which comprises:

a. hydrogenating a racemic or optically active 2-acyl-1,3,4,7,8,8$a$-hexahydro-6(2H)-isoquinolone to yield the corresponding racemic or optically active cis or trans 2-acyl-octahydro-6(2H)-isoquinolone; and b. converting the reaction product of step (a), through a Schmidt Rearrangement, to the corresponding racemic or optically active cis or trans 7-acyl-decahydro-2H-pyrido[3,4-$d$]azepin-2-one.

Alternatively, by a process which comprises:

a. converting, through A Schmidt Rearrangement, a racemic or optically active 2-acyl-1,3,4,7,8,8$a$-hexahydro-6(2H)-isoquinolone to the corresponding racemic or optically active 2-acyl-1,2,3,4,7,8,9,9a-octahydro-6H-pyrido[3,4-d]azepin-6-one; and b. hydrogenating the reaction product of step (a) to yield the corresponding racemic or optically active cis or trans 7-acyl-decahydro-2H-pyrido[3,4-d]azepin-2-one.

In yet another aspect, the invention relates to novel compounds.

DETAILED DESCRIPTION OF THE INVENTION

The term "lower alkyl" as used herein denotes a hydrocarbon group containing 1–7 carbon atoms, such as methyl, ethyl, propyl, butyl and the like; methyl and ethyl are prefered. The term "lower alkoxy" denotes a lower alkyl ether group in which the lower alkyl moiety is described as above, such as methoxy, ethoxy, propoxy, butoxy and the like; methoxy and ethoxy are preferred. The term "halogen" denotes all of the halogens i.e., bromine, chlorine, fluorine and iodine. Preferred are chlorine and bromine. The term "acyl" denotes lower alkanoyl of 1–7 carbon atoms such as formyl, acetyl, propanoyl, butanoyl, heptanoyl, and the like; ar-lower alkanoyl, preferably phenyl-lower alkanoyl wherein phenyl may be substituted by one or more lower alkyl, lower alkoxy or halogen groups such as benzoyl and the like. The term "aryl" means phenyl which may be substituted by one or more lower alkyl, lower alkoxy or halogen groups. The term "aralkyl" means a hydrocarbon group of 7–12 carbon atoms such as benzyl, phenethyl, phenylpropyl and the like. The term "acyloxy" means an acyloxy wherein the acyl moiety is as hereinbefore described, for example, lower alkanoyloxy and ar-lower alkanoyloxy.

The process for preparing quinine, quinidine, isomers and derivatives thereof is exemplified by Reaction Scheme Ia, Ia′, Ia″, Ib, Ib′ and Ib″.

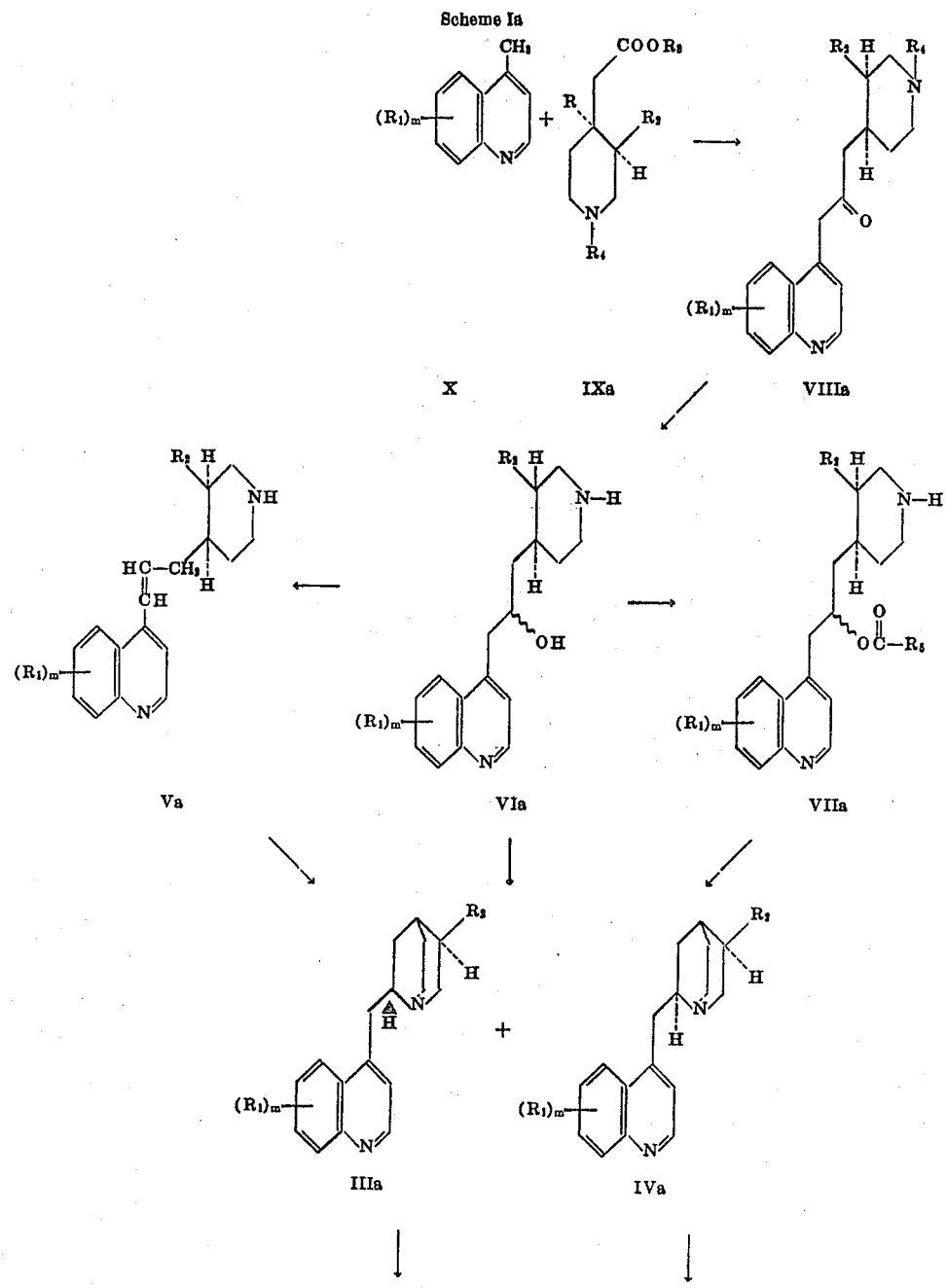

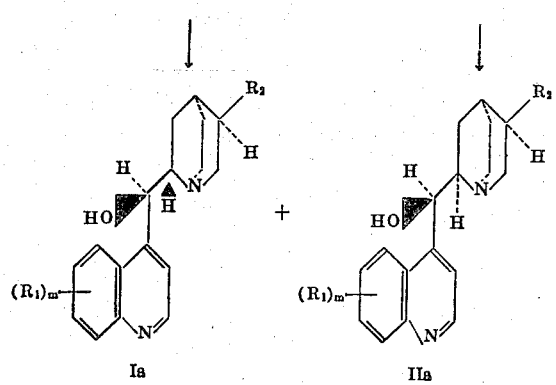

wherein m is 0, 1 or 2; $R_1$ is hydrogen, hydroxy, halogen, trifluoromethyl, lower alkyl, lower alkoxy, or when m is 2, $R_1$, taken together with an adjacent $R_1$, is also methylenedioxy; $R_2$ is vinyl or lower alkyl, preferably ethyl; $R_3$ is hydrogen or lower alkyl; $R_4$ is hydrogen or acyl; and $R_5$ is lower alkyl, aryl or ar-lower alkyl. As is evident from the above when m is 2, $R_1$ or the like is individually selected from the various groupings hereinbefore described.

Compounds of the formula Ia and IIa above are useful as antimalarial and antiarrhythmic agents.

In Reaction Scheme Ia, 4-methyl-quinolines of formula X, which are known compounds or are analogs of known compounds readily obtained by known procedures, are condensed with 1-acyl (or 1-H)-3(R)-vinyl(or lower alkyl)-4(S)-piperidineacetic acid ester of formula IXa, antipode or its racemate which are known compounds, are analogs of known compounds readily obtained by known procedures, or are prepared as hereinafter described, in the presence of a base, for example, sodium hydride, an alkali metal alkoxide such as sodium methoxide, or lithium dialkylamide such as lithium diisopropylamide to yield 4-{3-[1-acyl(or 1-H)-3(R)-vinyl(or lower alkyl)-4(S)-piperidyl]-2-oxopropyl}quinoline of formula VIIIa, antipode or its racemate. The condensation is suitably carried out at room temperature; however, temperatures above or below room temperature may be employed. Preferably, the condensation is conducted at a temperature within the range of about −70° and about 50°C. Moreover, the condensation can be suitably carried out in the presence of an inert organic solvent, for example, a hydrogen, such as benzene, hexane and the like, or an ether such as ether, tetrahydrofuran or dioxane, or dimethylformamide or hexamethylphosphoramide.

The 4-{3-[1-acyl(or 1-H)-3(R)-vinyl(or lower alkyl)-4(S)-piperidyl]-2-oxopropyl } quinoline of formula VIIIa, antipode or its racemate is converted to the mixture of epimeric 4-{3-[3(R)-vinyl(or lower alkyl)-4(S)-piperidyl]-2ξ-hydroxypropyl } quinolines of formula VIa, their antipodes or racemates by simultaneous deacylation, if necessary, and reduction. The deacylation and reduction are conveniently effected utilizing a reducing agent, for example, diisobutylaluminum hydride, sodium aluminum hydride and the like, in an inert organic solvent, for example, a hydrocarbon such as benzene or toluene, ether, tetrahydrofuran and the like. The deacylation and reduction are suitably carried out at room temperature or below, preferably, at a temperature within the range of about −70° to about 25°C. The reduction and deacylation can also be carried out stepwise, i.e., by first reducing a compound of formula VIIIa, wherein $R_4$ is acyl, with sodium borohydride, followed by deacylation utilizing, for example, aqueous hydrochloric or sulfuric acid as the deacylating agent. If desired, the compound of formula VIa can be esterified to the corresponding mixture of epimeric 4-{3-[3(R)-vinyl(or lower alkyl)-4(S)-piperidyl]-2ξ-acyloxypropyl}quinolines of formula VIIa, their antipodes or racemates utilizing known procedures, for example, reaction with the corresponding organic acid in the presence of a catalyst, such as boron trifluoride. Alternatively, if desired, the compound of formula VIa and can be converted to cis and trans 4-{3-[3 (R)-vinyl(or lower alkyl)-4(R)-piperidyl]-prop-1-enyl}quinolines of formula Va, their antipodes or racemates utilizing a dehydrating agent such as thionyl chloride, phosphorus oxychloride, phosphorus pentachloride and the like, in the presence of an organic base, for example, a tertiary amine such as pyridine, triethylamine and the like, at a temperature within the range of about 0° to about room temperature.

The cyclization of epimeric 4-{3-[3(R)-vinyl(or lower alkyl)-4(S)-piperidyl]-2ξ-hydroxy(or acyloxy)-propyl}quinolines of formulas VIa and VIIa, their antipodes or racemates, respectively and cis and trans 4-{3-[3(R)-vinyl(or lower alkyl)-4(R)-piperidyl]prop-1-enyl}quinolines of formula Va, their antipodes or racemates to 4-{α-[5(R)-vinyl(or lower alkyl)-4(S)-quinuclidin-2(S) and 2(R)-yl]methyl}quinolines of formulas IIIa and IVa, their antipodes or its racemate is carried out utilizing a cyclizing agent, for example, an organic acid, such as glacial acetic acid or the like. The cyclization is suitably carried out at room temperature; however, temperatures above or below room temperature may also be employed. It is preferred to employ a temperature within the range of about 25° to about 100°C. Moreover, the cyclization can be conveniently conducted in the presence of an inert organic solvent, for example, a hydrocarbon such as benzene or toluene, or an ether, such as diethyl ether or tetrahydrofuran.

The hydroxylation of the compounds of formulas IIIa and IVa or their racemates to α(R)-[5(R)-vinyl(or lower alkyl)-4(S)-quinuclidin-2(S)-yl]-4-quinolinemethanol of formula Ia, its antipode or racemate and α(S)-[5(R)-vinyl or lower alkyl)-4(S)-quinuclidin-2(R)-yl]-4-quinolinemethanol of formula IIa, its antipode or racemate, respectively, is carried out, for example, in the presence of molecular oxygen and a reducing agent, such as dimethylsulfoxide, pyridine, triphenylphosphine, platinum black, or a trialkylphosphite, such as triethylphosphite, or the like, in a strongly basic solution.

A suitable base for the reaction described above comprises, for example, an alkali metal alkoxide, such as potassium t-butoxide, sodium t-butoxide, sodium isoamylate, sodium methoxide or the like, or an alkali metal amide, such as lithium diisopropylamide, sodium amide or the like. Conveniently, a solvent such as dimethylsulfoxide, dimethylformamide, hexamethylphosphoramide, pyridine, t-butanol, a hydrocarbon such as benzene or toluene, an ether such as tetrahydrofuran, dioxane or the like, or mixtures thereof can be utilized. A preferred reaction medium comprises a mixture of dimethylsulfoxide and t-butanol in the presence of potassium t-butoxide.

Scheme Ia'

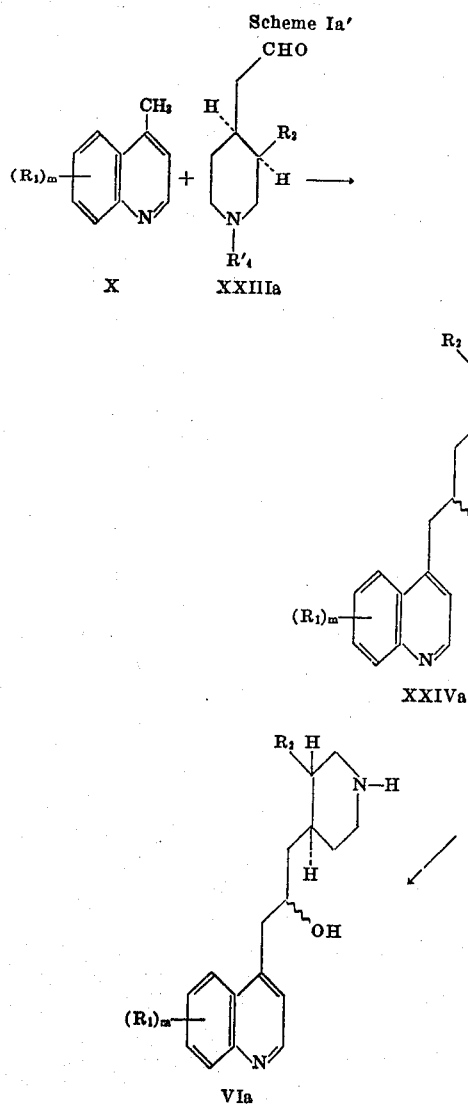

wherein $R_1$, $R_2$ and $m$ are as previously described and $R'_4$ in acyl.

In Reaction Scheme Ia' an alternative process for the preparation of compounds of formula VIa is described. 4-Methylquinolines of formula X are condensed with 1-acyl-3(R)-vinyl(or lower alkyl)-4(S)-piperidineacetaldehyde of formula XXIIIa, its antipode or racemate which are new compounds and are prepared as hereinafter described, in the presence of base, for example, sodium hydride, an alkali metal alkoxide such as sodium methoxide, or lithium dialkyamide such as lithium diisopropylamide to yield the mixture of epimeric 4-{3-[1-acyl-3(R)-vinyl-(or lower alkyl)-4(S)-piperidyl]-2ξ-hydroxypropyl} quinolines of formula XXIVa, their antipodes or racemates. The compounds of formula XXIVa are deacylated to the corresponding mixture of epimeric 4-{3-[3(R)-vinyl(or lower alkyl)-4(S)-piperidyl]-2ξhydroxypropyl} quinolines of formula VIa, their antipodes or racemates, utilizing a deacylating agent, for example, alkali metal hydroxide, such as sodium hydroxide or potassium hydroxide, a reductive deacylating agent such as lithium aluminum hydride, sodium aluminum hydride, diisobutyl aluminum hydride and the like. Preferably, the deacylation is suitably carried out at room temperature; however, temperatures above and below room temperature may be employed. Moreover, the deacylation can be suitably carried out in the presence of an inert organic solvent, for example, a lower alkanol, such as methanol or ethanol, or an ether, such as tetrahydrofuran or dioxane.

Scheme Ia''

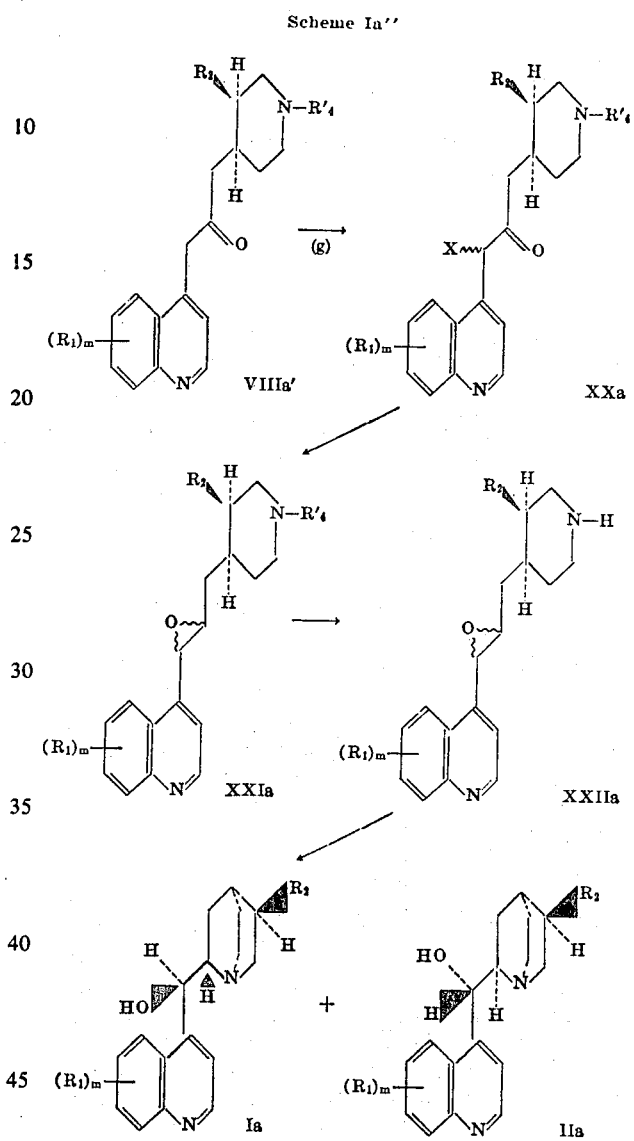

wherein $R_1$, $R_2$, $R'_4$ and $m$ are as previously described and X is halogen.

In Reaction Scheme Ia'', an alternative process for the conversion of compounds of formula VIIIa to the compounds of formulas Ia and IIa is described. The conversion of the 4-{3-[1-acyl-3(R)-vinyl(or lower alkyl-4(S)-piperidyl]-2-oxopropyl} quinoline of formula VIIIa', its antipode or racemate to the corresponding mixture of epimeric 4-{3-[1-acyl-3(R)-vinyl(or lower alkyl)4(S)-piperidyl]-1ξ-halo-2-oxopropyl}quinolines of formula XXa, their antipodes or racemates, respectively, is effected utilizing a halogenating agent such as N-bromo-succinimide, N-chloro-succinimide, N-bromoacetamide and the like. The halogenation can be conducted in an inert organic solvent, for example, a hydrocarbon such as benzene, toluene and the like, a halogenated hydrocarbon such as carbon tetrachloride; an ether such as diethylether, tetrahydrofuran, dioxane and the like. Conveniently, the reaction can be initiated by a free radical catalyst such as dibenzoylperoxide or by irradiation with infrared. The temperature is not critical, however, it is preferred to conduct the reaction at a temperature in the range of about room temperature and the reflux temperature of the reaction mixture.

The conversion of the epimeric compounds of formula XXa, their antipodes or racemates to the corresponding mixture of diastereomeric 4-{3-[1-acyl-3(R)-vinyl(or lower alkyl)-4(S)-piperidyl]-1ξ,2ξ-oxapropyl}quinolines of the formula XXIa, their antipodes or racemates can be effected utilizing a reducing agent, for example, alkali metal hydrides such as sodium borohydride, potassium borohydride, lithium tri-tertiarybutoxyaluminum hydride and the like. The reduction is conveniently effected in an inert organic solvent, for example, aliphatic alcohols such as methanol, ethanol and the like; ethers such as diethylether, tetrahydrofuran, dioxane and the like, at a temperature in the range of about −70°C. and about the reflux temperature of the reaction mixture.

The conversion of the compound of formula XXIa to the corresponding mixture of the diastereomeric 4-{3-[3(R)-vinyl(or lower alkyl)-4(S)-piperidyl]-1ξ,2ξ-oxopropyl}quinolines of the formula XXIIa, their antipodes or racemates is effected using a deacylating agent, for example, alkali hydroxides such as sodium hydroxide, potassium hydroxide, or a reducing deacylating agent, for example, dialkylaluminum hydride such as diisobutylaluminum hydride, or an alkali metal aluminum hydride such as lithium aluminum hydride, sodium aluminum hydride and the like. The deacylation is conveniently conducted in the presence of an inert organic solvent, for example, lower alkanols such as methanol, ethanol and the like, hydrocarbons such as toluene and the like, ethers such as diethylether, tetrahydrofuran and the like. The deacylation temperature is not critical. Conveniently, it may be in the range of about −70°C. to about the reflux temperature of the reaction mixture.

The conversion of the compounds of formula XXIIa to the corresponding mixture comprising α(R)-[5(R)-vinyl(or lower alkyl)-4(S)-quinuclidin-2(S)-yl]-4-quinolinemethanol of formula Ia, its antipode or racemate and α(S)-[5(R)-vinyl(or lower alkyl)-4(S)-quinuclidin-2(R)-yl]-4-quinolinemethanol of formula IIa, its antipode or racemate is effected by reaction with a weak organic or inorganic protonic acid, for example, water, ammonium chloride, lower alkanols such as methanol, ethanol and the like, Lewis acids such as aluminum oxide, aluminum chloride, boron trifluoride and the like. Conveniently, conversion is conducted in the presence of an inert organic solvent, for example, carbon disulfide, hydrocarbons such as benzene, toluene and the like, chlorinated hydrocarbons such as dichloromethane, carbontetrachloride, chloroform and the like, and ehters such as diethylether, tetrahydrofuran, dioxane and the like. The temperature of the reaction is not critical. Conveniently, it may be in the range of about 0°C. and about the reflux temperature of the reaction mixture.

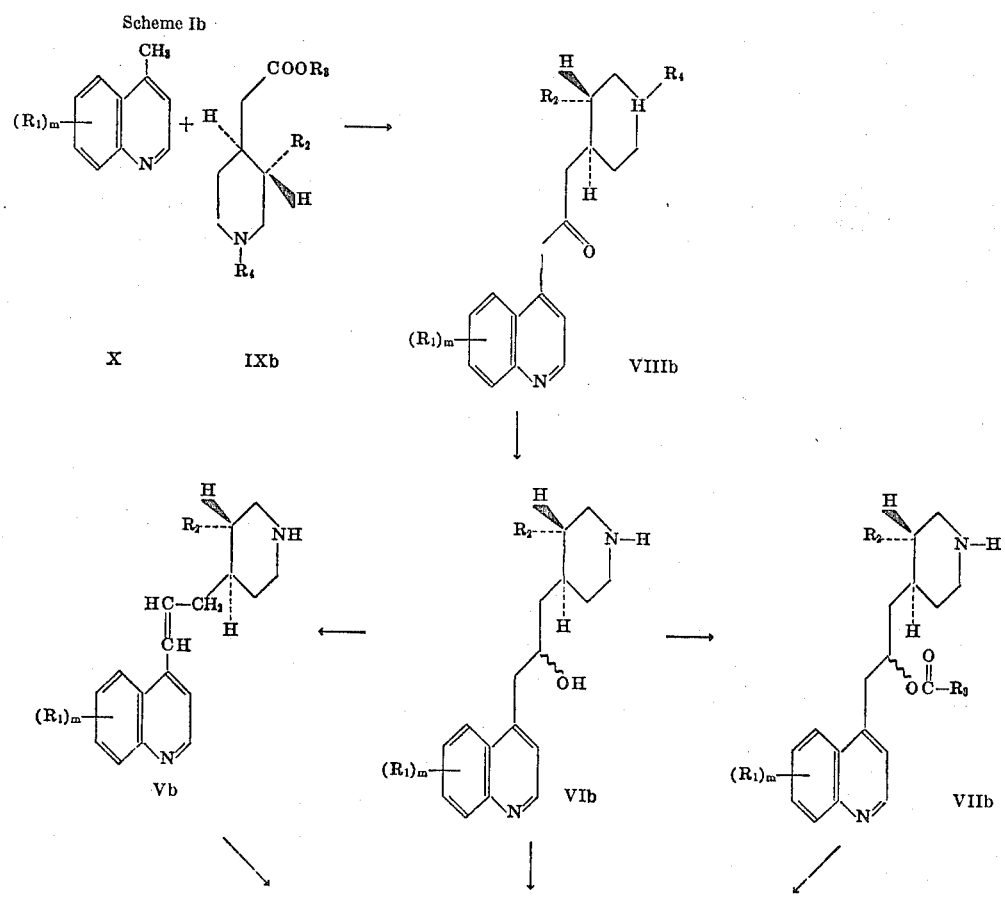

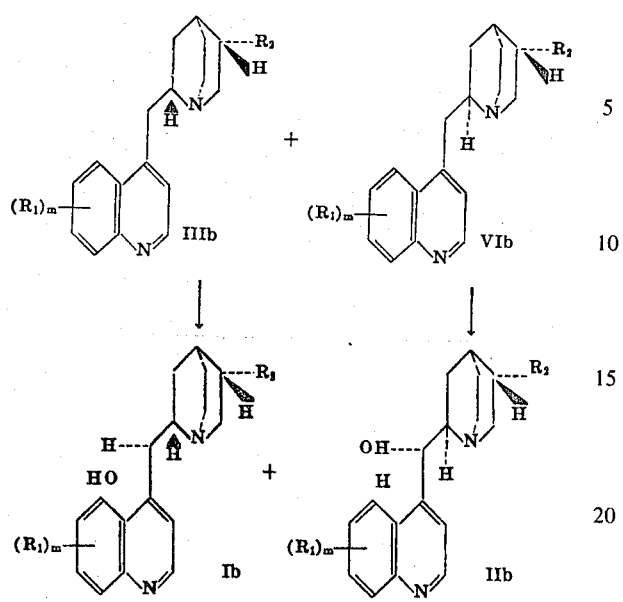

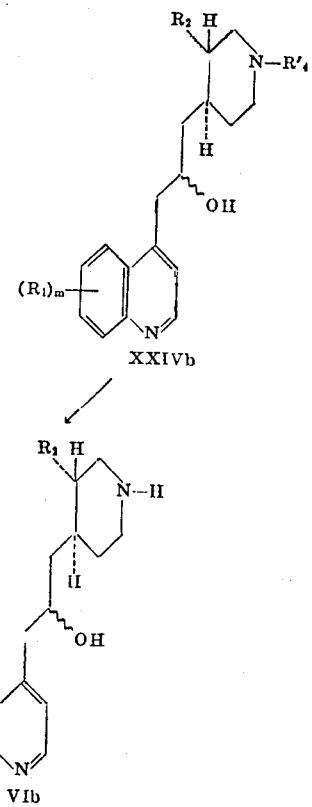

wherein $R_1$, $R_2$, $R_3$, $R_4$, $R_5$ and $m$ are as previously described.

The hereinafter described reaction steps of Reaction Scheme Ib are effected utilizing the procedures and conditions set forth in Scheme Ia. The 4-methyl-quinoline of formula X is condensed with 1-acyl(or 1-N)-3(S)-vinyl(or lower alkyl)-4(S)-piperidineacetic acid ester of formula IXb, its antipode or racemate to yield 4-{3-[1-acyl(or 1-H)-3(S)-vinyl(or lower alkyl)-4(S)-piperidyl]-2-oxopropyl} quinoline of formula VIIIb, its antipode or racemate. The compound of formula VIIIb is deacylated, if necessary, and reduced to the mixture of epimeric 4-{3-[3(S)-vinyl(or lower alkyl)-4(S)-piperidyl]-2ξ-hydroxypropyl}quinolines of formula VIb, their antipodes or racemates. If desired, the compounds of formula VIb can be esterified to the mixture of epimeric 4-{3-[3(S)-vinyl(or lower alkyl)-4(S)-piperidyl]-2ξ-acyloxypropyl} quinolines of formula VIIb, their antipodes or racemates or, alternatively, it can be converted to cis and trans 4-{3-[3 (S)-vinyl(or lower alkyl)-4(R)-piperidyl]-prop-1-enyl}quinolines of formula Vb, their antipodes or racemates. The compounds of formula Vb, VIb, or VIIb are cyclized to 4-{α-[5(S)-vinyl(or lower alkyl)-4(S)-quinuclidin-2(S) and 2(R)-yl]-methyl}quinolines of formulas IIIb and IVb, their antipodes or racemates. The compounds of formulas IIIb and IVb are hydroxylated to α(R)-[5(S)-vinyl(or lower alkyl)-4(S)-quinuclidin-2(S)-yl]-4-quinolinemethanol of formula Ib, its antipode or racemate and α(S)-[5(S)-vinyl(or lower alkyl)-4(S)-quinuclidin-2(R)-yl]-4-quinolinemethanol of formula IIc, its antipode or racemate, respectively.

Scheme Ib'

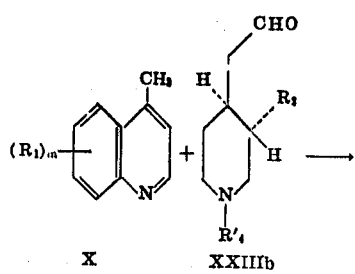

wherein $R_1$, $R_2$, $R'_4$ and $m$ are as previously described.

The hereinafter described reaction steps of Reaction Scheme Ib' are effected utilizing the procedures and conditions set forth in Scheme Ia'. 4-Methyl-quinolines of formula X are condensed with 1-acyl-3(S)-vinyl(or lower alkyl)-4(S)-piperidineacetaldehyde of formula XXIIIb, its antipode or racemate which are new compounds and are prepared as hereinafter described, to yield the mixture of epimeric 4-{3-[1-acyl-3(S)-vinyl(or lower alkyl)-4(S)-piperidyl]-2ξ-hydroxypropyl}quinolines of formula XXIVb, their antipodes or racemates. The compounds of formula XXIVb are deacylated to the corresponding mixture of epimeric 4- {3-[3(S)-vinyl(or lower alkyl)-4(S)-piperidyl]-2ξ-hydroxypropyl}quinolines of formula VIb, their antipodes or racemates.

The hydroxylation of the compound of Formula IIIa,-b–IVa,b to the end products of Formulas Ia,b–IIa,b, i.e.,

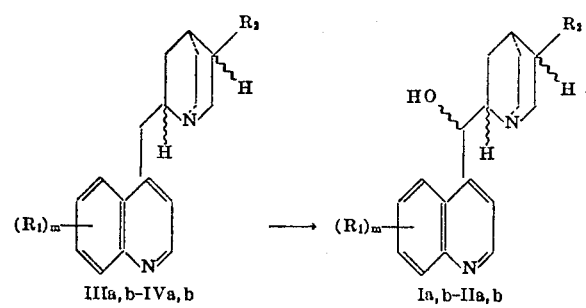

can also be effected utilizing molecular oxygen and a catalyst such as platinum, tris(triphenylphosphine)rhodium chloride or the like or by oxidation utilizing a compound such as selenium dioxide, ruthenium tetroxide, palladium acetate, mercuric acetate, thallium triacetate, manganese dioxide, cerium (IV) oxide, or the like.

Alternate procedures for the conversion of the compounds of Formula VI*a,b* to the corresponding compound of Formula III*a,b*–IV*a,b* are exemplified in Reaction Scheme V.

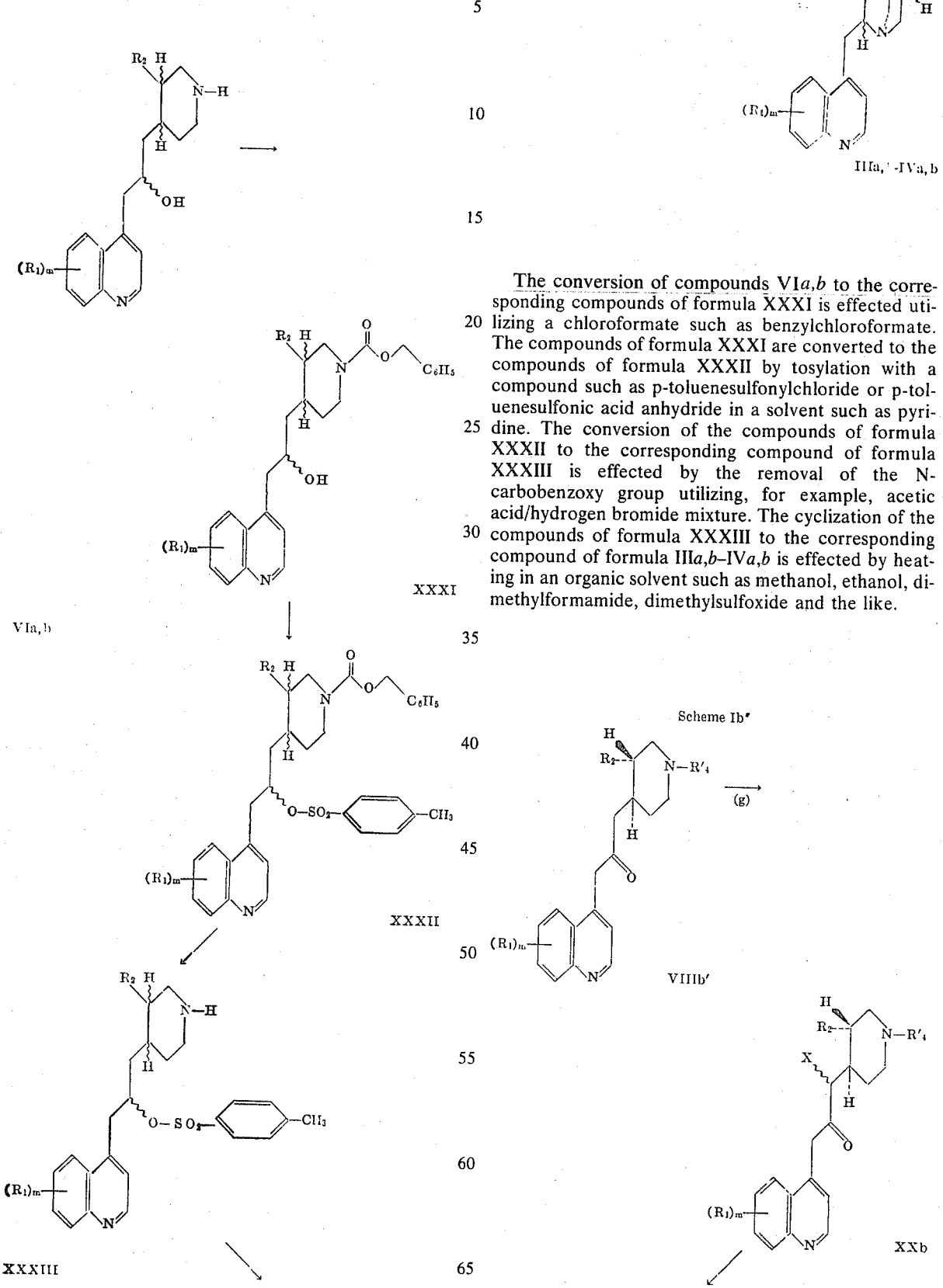

The conversion of compounds VI*a,b* to the corresponding compounds of formula XXXI is effected utilizing a chloroformate such as benzylchloroformate. The compounds of formula XXXI are converted to the compounds of formula XXXII by tosylation with a compound such as p-toluenesulfonylchloride or p-toluenesulfonic acid anhydride in a solvent such as pyridine. The conversion of the compounds of formula XXXII to the corresponding compound of formula XXXIII is effected by the removal of the N-carbobenzoxy group utilizing, for example, acetic acid/hydrogen bromide mixture. The cyclization of the compounds of formula XXXIII to the corresponding compound of formula III*a,b*–IV*a,b* is effected by heating in an organic solvent such as methanol, ethanol, dimethylformamide, dimethylsulfoxide and the like.

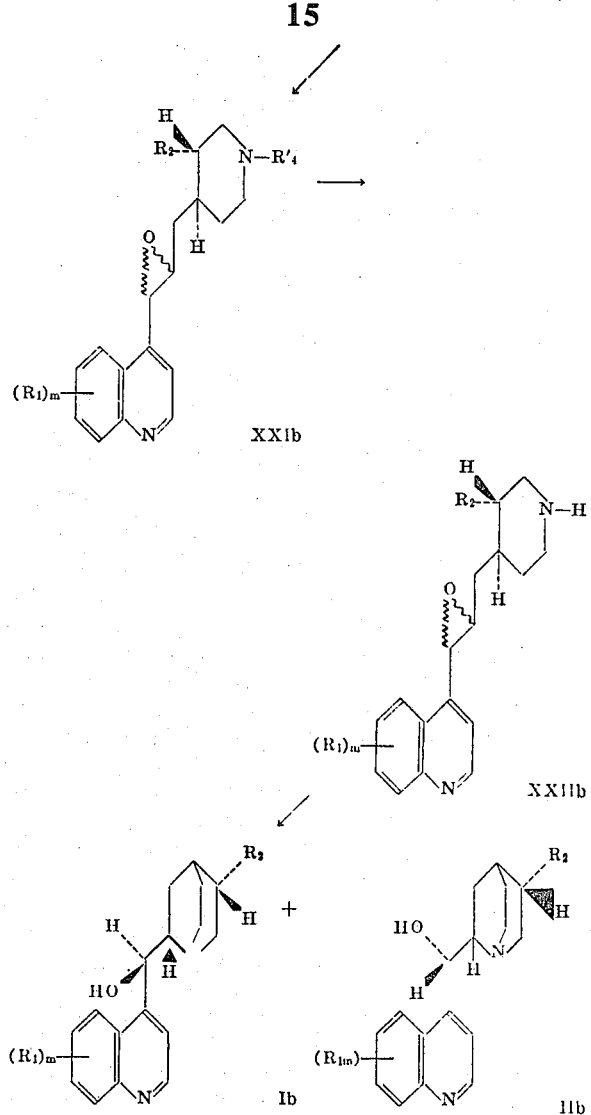

wherein $R_1$, $R_2$, $R'_4$, $m$ and $X$ are as previously described.

In Reaction Scheme Ib'', an alternative process for the conversion of compounds of formula VIIIb' to the compounds of formulas Ib and IIb is described. The conversion of the 4-{3-[1-acyl-3(S)-vinyl(or lower alkyl)-4(S)-piperidyl]-2-oxopropyl} quinoline of formula VIIIb', its antipode or racemate to the corresponding mixture of epimeric 4-{3-[1-acyl-3(S)-vinyl(or lower alkyl)-4(S)-piperidyl]-1ξ-halo-2-oxopropyl}quinolines of formula XXb, their antipodes or racemates, respectively, is effected utilizing a halogenating agent such as N-bromo-succinimide, N-chloro-succinimide, N-bromoacetamide and the like. The halogenation can be conducted in an inert organic solvent, for example, a hydrocarbon such as benzene, toluene and the like, a halogenated hydrocarbon such as carbon tetrachloride; an ether such as diethylether, tetrahydrofuran, dioxane and the like. Conveniently, the reaction can be initiated by a free radical catalyst such as dibenzoylperoxide or by irradiation with infrared. The temperature is not critical, however, it is preferred to conduct the reaction at a temperature in the range of about room temperature and the reflux temperature of the reaction mixture.

The conversion of the epimeric compounds of formula XXb, their antipodes or racemates to the corresponding mixture of diastereomeric 4-{3-[1-acyl-3(S)-vinyl(or lower alkyl)-4(S)-piperidyl]-1ξ,2ξ-oxapropyl}quinolines of the formula XXIb, their antipodes or racemates can be effected utilizing a reducing agent, for example, alkali metal hydrides such as sodium borohydride, potassium borohydride, lithium tri-tertiarybutoxyaluminum hydride and the like. The reduction is convveniently effected in an inert organic solvent, for example, aliphatic alcohols such as methanol, ethanol and the like; ethers such as diethylether, tetrahydrofuran, dioxane and the like, at a temperature in the range of about −70°C. and about the reflux temperature of the reaction mixture.

The conversion of the compound of formula XXIb to the corresponding mixture of the diastereomeric 4-{3-[3(S)-vinyl(or lower alkyl)-4(S)-piperidyl]-1ξ,2ξ-oxapropyl}quinolines of the formula XXIIb, their antipodes or racemates is effected using a deacylating agent, for example, alkali hydroxides such as sodium hydroxide, potassium hydroxide, or a reducing deacylating agent, for example, dialkylaluminum hydride such as diisobutylaluminum hydride, or an alkali metal aluminum hydride such as lithium aluminum hydride, sodium aluminum hydride and the like. The deacylation is conveniently conducted in the presence of an inert organic solvent, for example, lower alkanols such as methanol, ethanol and the like, hydrocarbons such as toluene and the like, ethers such as diethylether, tetrahydrofuran and the like. The deacylation temperature is not critical. Conveniently, it may be in the range of about −70°C. to about the reflux temperature of the reaction mixture.

The conversion of the compounds of formula XXIIb to the corresponding mixture comprising α(R)-[5(S)-vinyl(or lower alkyl)-4(S)-quinuclidin-2(S)-yl]-4-quinolinemethanol of formula Ib, its antipode or racemate and α(S)-[5(S)-vinyl(or lower alkyl)-4(S)-quinuclidin-2(R)-yl]-4-quinolinemethanol of formula IIb, its antipode or racemate is effected by reaction with a weak organic or inorganic protonic acid, for example, water, ammonium chloride, lower alkanols such as methanol, ethanol and the like, Lewis acids such as aluminum oxide, aluminum chloride, boron trifluoride and the like. Conveniently, conversion is conducted in the presence of an inert organic solvent, for example, carbon disulfide, hydrocarbons such as benzene, toluene and the like, chlorinated hydrocarbons such as dichloromethane, carbontetrachloride, chloroform and the like, and ethers such as diethylether, tetrahydrofuran, dioxane and the like. The temperature of the reaction is not critical. Conveniently, it may be in the range of about 0°C. and about the reflux temperature of the reaction mixture.

The various other process aspects of the invention are exemplified by the following reaction schemes IIa, IIb, IIIa, IIIb and IV.

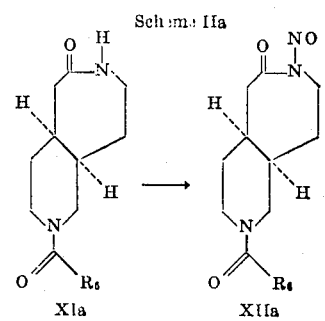

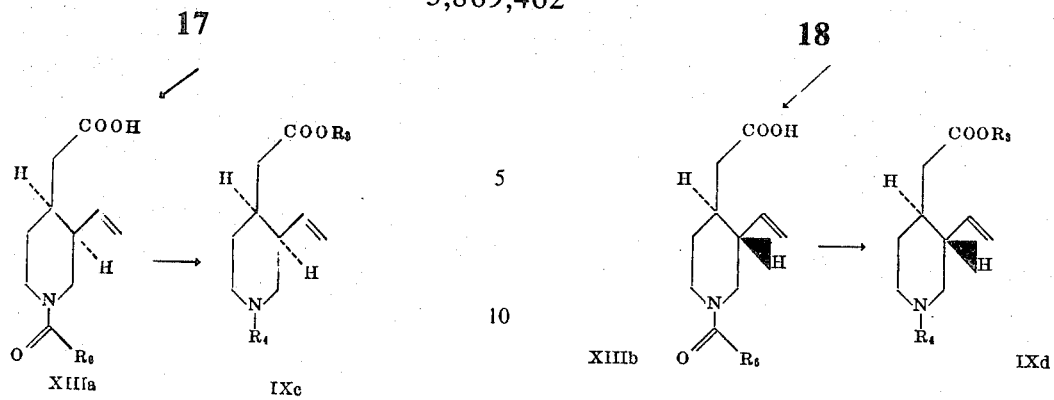

wherein $R_3$ and $R_4$ are as previously described, and $R_5$ is lower alkyl, aryl or ar-lower alkyl.

In Reaction Scheme IIa, the conversion of 7-acyl-decahydro-2H-pyrido[3(R),4(S)-d]azepin-2-one of formula XIa, its antipode or racemate to 7-acyl-1-nitroso-decahydro-2H-pyrido[3(R),4(S)-d]-azepin-2-one of formula XIIa, its antipode or racemate, respectively, is carried out utilizing a nitrosating agent, such as, for example, sodium nitrite or dinitrogen tetroxide. Conveniently, the reaction can be conducted in the presence of a solvent, for example, an organic acid such as acetic acid, or a chlorinated hydrocarbon such as carbon tetrachloride. The nitrosation is conveniently conducted at a temperature within the range of about 0°C. to about room temperature, preferably at 0°C.

The compound of formula XIIa is converted to 1-acyl-3(R)-vinyl-4(S)-piperidineacetic acid of formula XIIIa, its antipode or racemate, respectively, by pyrolysis. Conveniently, the pyrolysis is conducted at a temperature within the range of about room temperature to about 200°C., preferably at a temperature within the range of about 100°C. to about 130°C. Conveniently, a high boiling solvent such as xylene, decaline and the like, can be utilized in the reaction.

The compound of formula XIIIa is converted to 1-acyl(or 1-H)-3(R)-vinyl-4(S)-piperidineacetic acid ester of formula IXc, its antipode or racemate, respectively, utilizing an esterifying agent, for example, a lower alkanol, such as methanol, ethanol, propanol and the like, in the presence of, for example, an inorganic acid such as hydrochloric acid, sulfuric acid and the like. When $R_4$ is hydrogen, however, the esterification is preceded by hydrolysis in the presence of, for example, an aqueous inorganic acid, such as hydrochloric acid, sulfuric acid and the like.

Compounds of formula XIa, wherein $R_2$ is alkyl, for instance, ethyl, can be prepared as described in Scheme IV.

wherein $R_3$, $R_4$ and $R_6$ are previously described.

In a like manner, in Reaction Scheme IIb, the conversion of 7-acyl-decahydro-2H-pyrido[3(S),4(S)-d]azepin-2-one of Formula XIb, its antipode or racemate to 7-acyl-1-nitroso-decahydro-2H-pyrido[3(S),4(S)-d]azepin-2-one of Formula XIIb, its antipode or racemate, respectively, is carried out. The compound of Formula XIIb is converted to 1-acyl-3(S)-vinyl-4(S)-piperidineacetic acid of Formula XIIIb, its antipode or racemate, respectively, by pyrolysis. The compound of Formula XIIIb is converted to 1-acyl(or 1-H)-3(S)-vinyl-4(S)-piperidineacetic acid ester of Formula IXd, its antipode or racemate, respectively.

Scheme IIIa,

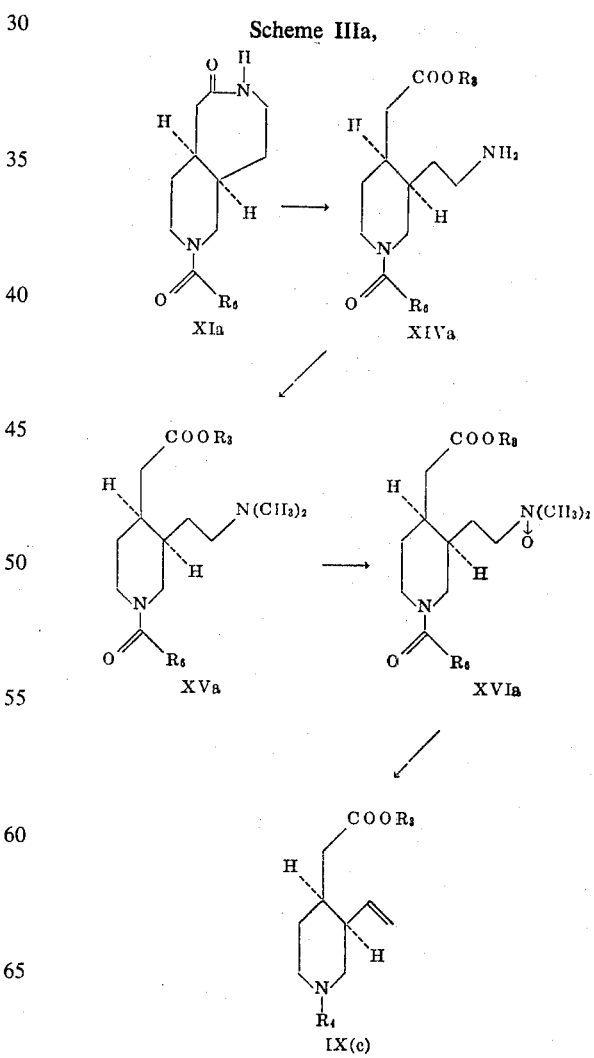

wherein R₃, R₄ and R₅ are as previously described.

In Reaction Scheme IIIa, 7-acyl-decahydro-2H-pyrido[3(R),-4(S)-d]azepin-2-one of formula XIa, its antipode or racemate is converted to 1-acyl-3(R)-(2-aminoethyl)-4(S)-piperidineacetic acid ester of formula XIVa, its antipode or racemate, respectively, utilizing an alcoholizing agent, for example, a lower alkanol such as methanol, ethanol, propanol and the like, in the presence of, for example, anhydrous inorganic acid such as hydrochloric acid, sulfuric acid and the like. Conveniently, the alcoholysis is conducted at a temperature within the range of about room temperature to about the boiling point of the alkanol.

The compound of formula XIVa is converted to 1-acyl-3(R)-(2-dimethylaminoethyl)-4(S)-piperidineacetic acid ester of formula XVa, its antipode or racemate, respectively, utilizing a methylating agent such as, for example, formic acid/formaldehyde mixture or formaldehyde/Raney nickel. The N-methylation is conveniently conducted at a temperature within the range of about room temperature to about the boiling point of the methylating agent.

The compound of formula XVa is converted to 1-acyl-3(R)-(2-dimethylaminoethyl)-4(S)-piperidineacetic acid ester N-oxide of formula XVIa, its antipode or racemate, respectively, utilizing an oxidizing agent, for example, hydrogen peroxide or a perorganic acid such as, peracetic acid. The oxidation is conveniently conducted in the presence of a solvent, for example, lower alkanol, such as methanol, ethanol, propanol and the like, or a hydrocarbon such as benzene and the like. The oxidation is conveniently conducted at a temperature within the range of about 0° to about room temperature, preferably at 0°C.

The compound of formula XVIa is converted to 1-acyl(or 1-H)-3(R)-vinyl-4(S)-piperidineacetic acid ester of formula IXc, its antipode or racemate, respectively, by pyrolysis. Such pyrolysis is conveniently conducted at a temperature in the range of about 80° to about 200°C., preferably at a temperature within the range of about 90° to about 125°C. When R₄ is hydrogen, however, the pyrolysis is followed by hydrolysis and reesterification.

SCHEME IIIb

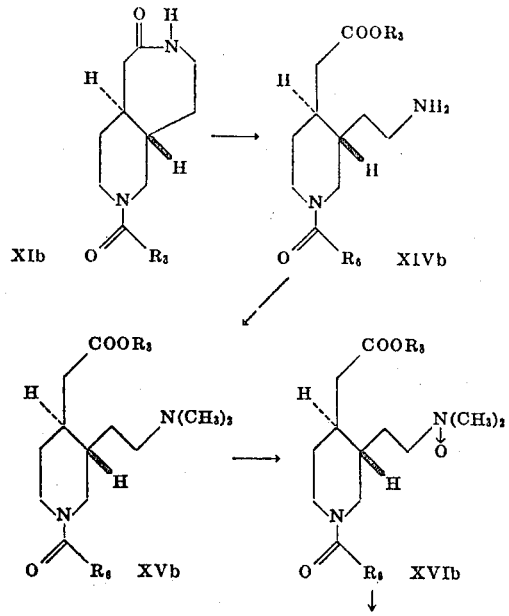

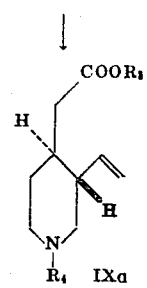

wherein R₃, R₄ and R₅ are as previously described.

In a like manner, in Reaction Scheme IIIb, 7-acyl-decahydro-2H-pyrido[3(S),4(S)-d]azepin-2-one of Formula XIb, its antipode or racemate is converted to 1-acyl-3(S)-(2-aminoethyl)-4(S)-piperidineacetic acid ester of Formula XIVb, its antipode or racemate, respectively. The compound of Formula XIVb is converted to 1-acyl-3(S)-(2-dimethylaminoethyl)-4(S)-piperidineacetic acid ester of Formula XVb, its antipode or racemate, respectively. The compound of Formula XVb is converted to 1-acyl-3(S)-(2-dimethylaminoethyl)-4(S)-piperidineacetic acid ester N-oxide of Formula XVIb, its antipode or racemate, respectively. The compound of Formula XVIb is converted to 1-acyl(or 1-H)-3(S)-vinyl-4(S)-piperidineacetic acid ester of Formula IXd, its antipode or racemate.

SCHEME IV

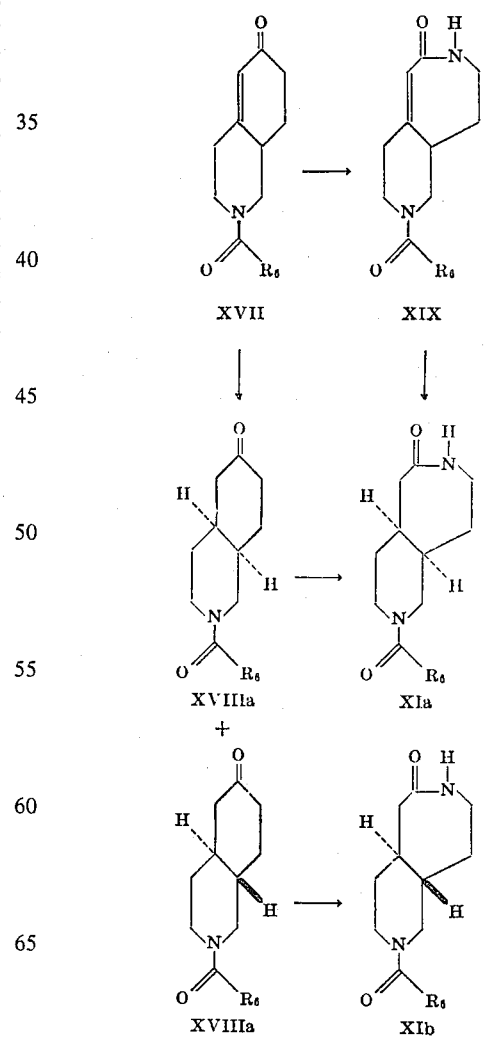

wherein $R_3$ is as previously described.

In the Reaction Scheme IV, racemic 2-acyl-1,3,4,7,8,8a-hexahydro-6(2H)-isoquinolone of formula XVII is converted to the racemic cis and trans 2-acyl-octahydro-6(2H)-isoquinolones of formula XVIIIa and XVIIIb, respectively, utilizing a hydrogenating agent, for example, hydrogen in the presence of palladium or rhodium catalyst. Conveniently, the hydrogenation can be conducted in the presence of a solvent, for example, a lower alkanol such as methanol, ethanol, propanol and the like, with or without an inorganic acid such as hydrohalic acid, for example, hydrochloric acid and the like. The hydrogenation can be conveniently conducted at a temperature within the range of about room temperature and about 50°C.

The racemates of the compounds of formula XVIIIa or XVIIIb are resolved to the corresponding optical antipodes by conventional methods which are further illustrated by Examples 3,4,5.

The conversion of 2-acyl-4a(S),8a(R)-octahydro-6(2H)-isoquinolone of formula XVIIIa, its antipode or racemate to 7-acyldecahydro-2H-pyrido[3(R),4(S)-d]azepin-2-one of formula XIa, its antipode or racemate, respectively, is carried out utilizing the known Schmidt rearrangement, i.e., the reaction of the compound of formula XVIIIa with sodium azide in the presence of an inorganic acid such as sulfuric acid or polyphosphoric acid, with or without solvent, at a temperature within the range of from about 0° to about 150°C.

In a like manner, 2-acyl-4a(S),8a(S)-octahydro-6(2H)-isoquinolone of Formula XVIIIb, its antipode or racemate is converted to 7-acyl-decahydro-2H-pyrido[3(S),4(S)-d]azepin-2-one of Formula XIb, its antipode or racemate, respectively.

The racemic compound of Formula XVII is converted to the racemic 2-acyl-1,2,3,4,7,8,9,9a-octahydro-6H-pyrido[3,4-d]azepin-6-one of Formula XIX utilizing the Schmidt rearrangement as hereinbefore described. The compound of Formula XIX is converted to the racemic compound of Formula XIa utilizing a hydrogenating agent such as hydrogen in the presence of a catalyst, such as rhodium or palladium, in a solvent, for example, an alkanol, such as ethanol, methanol and the like, in the presence of an inorganic acid, such as hydrochloric acid.

In another aspect, the invention relates to the compounds of formulas Ib, IIb, IIIb, IVb, Va, Vb, VIa, VIb, VIIa, VIIb, VIIIa, VIIIb, IXb, XIa, XIb, XIIa, XIIb, XIIIb, XIVa, XIVb, XVa, XVb, XVIa, XVIb and XIX.

The compounds of formulas Ib and IIb are useful as antimalarial and antiarrhythmic agents; all the other compounds listed in the above paragraphs are useful intermediates.

In still another aspect, the invention relates to compounds of the formulas

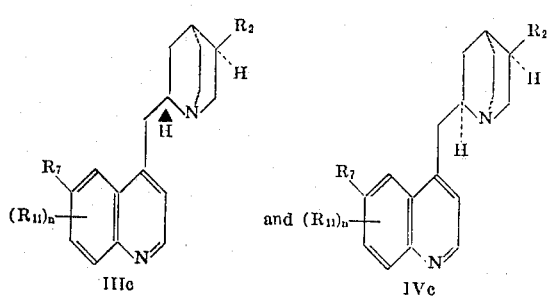

wherein $n$ is 0 to 2; $R_2$ is vinyl or lower alkyl; $R_{11}$ is hydrogen, hydroxy, lower alkyl, lower alkoxy, trifluoromethyl, halogen, or when $n$ is 2, $R_{11}$, taken together with an adjacent $R_{11}$, is also methylenedioxy; when $R_{11}$ is hydrogen, $R_7$ is $C_2$-$C_7$ alkoxy, lower alkyl, trifluoromethyl or halogen; when $R_{11}$ is other than hydrogen and $n$ is 1, $R_7$ is lower alkoxy, lower alkyl, hydroxy, hydrogen, trifluoromethyl, halogen, or taken together with an adjacent $R_{11}$, is methylenedioxy; and $R_{11}$ is other than hydrogen and $n$ is 2, $R_7$ is hydrogen, and their antipodes and racemates.

Also included in the purview of the invention are compounds of the formulas

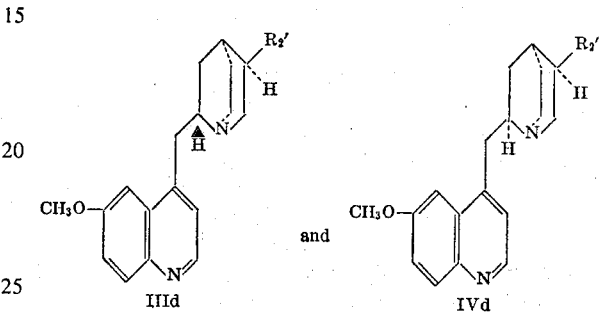

wherein $R_2'$ is methyl or $C_3$-$C_7$ lower alkyl, their antipodes and racemates.

Compounds of formulas IIIc, IIId, IVc and IVd are useful intermediates.

In still another aspect, the invention relates to compounds of the formulas

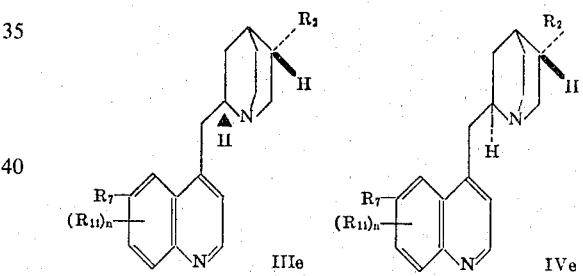

wherein $n$ is 0 to 2; $R_2$ is vinyl or lower alkyl; $R_{11}$ is hydrogen, hydroxy, lower alkyl, lower alkoxy, trifluoromethyl, halogen, or when $n$ is 2, $R_{11}$, taken together with an adjacent $R_{11}$, is also methylenedioxy; when $R_{11}$ is hydrogen, $R_7$ is $C_2$-$C_7$ alkoxy, lower alkyl, trifluoromethyl or halogen; when $R_{11}$ is other than hydrogen and $n$ is 1, $R_7$ is lower alkoxy, lower alkyl, hydrogen, trifluoromethyl, halogen, or taken together with an adjacent $R_{11}$ is methylenedioxy; and when $R_{11}$ is other than hydrogen and $n$ is 2, $R_7$ is hydrogen and their antipodes and racemates.

As is evident from the above $R_7$ or $R_{11}$ or the like are individually selected from the various groupings hereinbefore described. Moreover, when $m$ or $n$ is 2, $R_7$ or $R_{11}$ or the like can additionally form with an adjacent $R_7$ or $R_{11}$ or the like the methylenedioxy radical. Thus, either when $m$ or $n$ is 1 or 2, $R_7$ or $R_{11}$ or the like can individually also represent hydrogen, hydroxy, halogen, lower alkyl, lower alkoxy or trifluoromethyl. Additionally, when $m$ or $n$ is 2, two adjacent groupings of $R_7$ or $R_{11}$ can together represent methylenedioxy.

In yet another aspect, the invention relates to compounds of the formulas

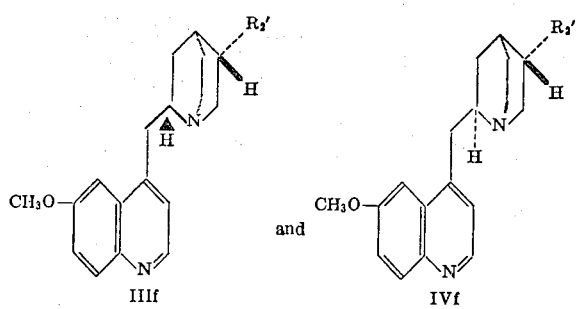

wherein $R_2'$ is methyl or $C_3$–$C_7$ lower alkyl, their antipodes and racemates.

Compounds of formulas IIIe, IIIf, IVe and IVf are useful intermediates.

In a further aspect, the invention relates to compounds of the formulas

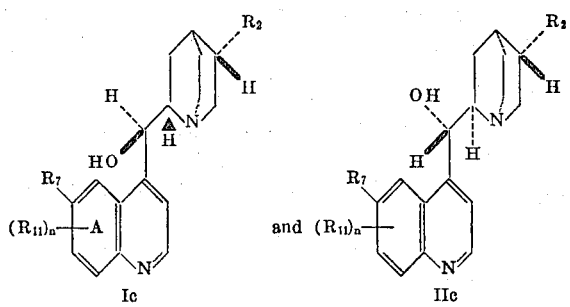

wherein $n$ is 0 to 2; $R_2$ is vinyl or lower alkyl; $R_{11}$ is hydrogen, hydroxy, lower alkyl, lower alkoxy, trifluoromethyl or halogen, and when $n$ is 2, $R_{11}$, taken together with an adjacent $R_{11}$, is also methylenedioxy; when $R_{11}$ is hydrogen, $R_7$ is $C_2$–$C_7$ alkoxy, lower alkyl, trifluoromethyl or halogen; when $R_{11}$ is other than hydrogen and $n$ is 1, $R_7$ is lower alkoxy, lower alkyl, hydrogen, trifluoromethyl or halogen, or taken together with an adjacent $R_{11}$, is methylenedioxy; and when $R_{11}$ is other than hydrogen and $n$ is 2, $R_7$ is hydrogen, and their antipodes and racemates, and pharmaceutically acceptable acid addition salts.

Exemplary of the compounds of formulas Ic and IIc are: 6,8-dimethoxy-α(R)-[5(S)-ethyl-4(S)-quinuclidin-2(S)-yl]-4-quinolinemethanol [hereinafter referred to as 6',8'-dimethoxy-3-epi-dihydrocinchonidine] its antipode and racemic analog;

7-chloro-α(R)-[5(S)-ethyl-4(S)-quinuclidin-2(S)-yl]-4-quinolinemethanol [hereinafter referred to as 7'-chloro-3-epidihydrocinchonidine] its antipode and racemic analog;

6,7-methylenedioxy-α(R)-[5(S)-ethyl-4(S)-quinuclidin-2(S)-yl]-4-quinolinemethanol [hereinafter referred to as 6',7'-methylenedioxy-3-epi-dihydrocinchonidine] its antipode and racemic analog;

7-trifluoromethyl-α(R)-[5(S)-ethyl-4(S)-quinuclidin-2(S)-yl]-4-quinolinemethanol [hereinafter referred to as 7'-trifluoromethyl-3-epi-dihydrocinchonidine] its antipode and racemic analog;

6,8-dimethoxy-α(S)-[5(S)-ethyl-4(S)-quinuclidin-2(R)-yl]-4-quinolinemethanol [hereinafter referred to as 6',8'-dimethoxy-3-epi-dihydrocinchonine] its antipode and racemic analog;

7-chloro-α(S)-[5(S)-ethyl-4(S)-quinucliden-2(R)-yl]-4-quinolinemethanol [hereinafter as 7'-chloro-3-epidihydrocinchonine] its antipode and racemic analog;

6,7-methylenedioxy-α(S)-[5(S)-ethyl-4(S)-quinuclidin-2(R)-yl]-4-quinolinemethanol [hereinafter referred to as 6',7'-methylenedioxy-3-epi-dihydrocinchonine] its antipode and racemic analog;

7-trifluoromethyl-α(S)-[55(S)-ethyl-4(S)-quinuclidin-2(R)-yl]-4-quinolinemethanol [hereinafter referred to as 7'-trifluoromethyl-3-epi-dihydrocinchonine] its antipode and racemic analog.

Also included in the purview of the invention are compounds of the formulas

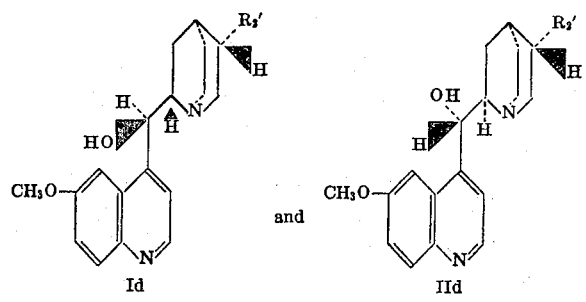

wherein $R_2'$ is vinyl, methyl or $C_3$–$C_7$ alkyl, their antipodes and racemates and pharmaceutically acceptable acid addition salts.

Also included in the purview of the invention are compounds of the formula:

The antipode of 6-methoxy-α(R)-[5(S)-ethyl-4(S)-quinuclidin-2(S)-yl]-4-quinolinemethanol [hereinafter referred to as 6'-methoxy-3-epi-dihydrocinchonidine or 3-epi-dihydroquinine] and its racemic analog (Compound A) and The antipode of 6-methoxy-α(S)-[5(S)-ethyl-4(S)-quinuclidin-2(R)-yl]-4-quinolinemethanol [hereinafter referred to as 6'-methoxy-3-epi-dihydrocinchonine or 3-epi-dihydroquinidine] and its racemic analog (Compound B).

The compounds of formulas Ic, Id, IIc and IId, as well as Compounds A and B, are useful also as antimalarial and antiarrhythmic agents.

The compounds of the formula IXa have demonstrated cardiovascular activity, such as, hypotensive activity. The pharmacologically useful cardiovascular activity is demonstrated in warm-blooded animals utilizing standard procedures. For example, the test compound is administered to anesthetized (30 mg/kg sodium pentobarbital), artifically respired (Palmer Pump) dogs. Femoral arterial blood pressure and respiratory resistance (measured in terms of pressure) are recorded on a direct writing oscillographic recorder. A series of "control" responses of the blood pressure and respiration are obtained and duplicated. The "control" procedures used are: intravenously administered norepinephrine (1 γ/kg), histamine (1 65 /kg), serotonin (25 γ/kg) and hypertensin (0.5 γ/kg), as well as the bilaterial occulsion of the carotid arteries and the electrical stimulation of the centeral portion of a severed vagus nerve (5V, 50 c.p.s., 10 sec.). Each of the control procedures is administered at 5-intervals. Five minutes after the series of control responses, the drug to be tested is intervenously administered and its effects recorded. The series of control procedures is repeated after dosing to determine the effect of the compound on these standard responses. If the control responses are unaltered by the test drug, a second compound is administered and the procedure repeated. If the test compound alters the blood pressure or the control responses, the control procedures are repeated at convenient intervals until the animal has returned to its predose status or a new physiological status is established.

When the meroquinene-t-butylester d-monotartrate of the formula

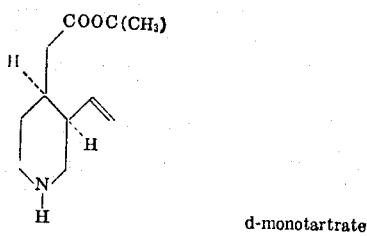

d-monotartrate is utilized as the test substance at a dose of 4 mg/kg. intravenously, the following results are obtained:

| | |
|---|---|
| blood pressure | —25 for 35 minutes |
| serotonin | N.E. |
| Central Vagus Stimulation | slight inhibition |
| Carotid Occlusion | blocking |
| Hypertension | N.E. |
| Norepinephrine | slight inhibition |
| Histamine | slight inhibition |

The compounds of Formula IXa also exhibit antiestrogenic activity. This useful estrogenic activity is demonstrated in warm-blooded animals. For example, the test compound is administered once daily for three consecutive days to groups of ten (10) immature female rats (40–50 grams). On the first treatment day, all rats are injected subcutaneously with 0.25 mcg. estradiol ion sesame oil. On the fourth day, uteri are removed at autopsy and weighed on a torsion balance.

When merquinene-t-butylester d-monotartrate is utilized as the test substance at a dosage of 1 mg/kg. p.o., an 11 percent antiestrogen inhibition is observed with a —12 percent uterine change.

The compounds of formulas Ia, IIa, Ib and IIb, including compounds of the formulas Ic, Id, IIc and IId, as well as compounds A and B, and their pharmaceutically acceptable acid addition salts possess antimalarial and antiarrhythmic properties and are therefore useful as antimalarial and antiarrhythmic agents. Their pharmacologically useful antiarrhythmic activity is demonstrated in warm-blooded animals utilizing standard procedures, for example, the test compound is administered to prepared mongrel dogs. The chest cavity of the experimental animal previously anesthetized using a combination of sodium barbitol, 300 mg/kg. and pentobarbitol, 15 mg/kg., i.e., is opened up through the third right interspace under artificial respiration and the pericardium is cut and sutured to the wall of the thorax so as to maintain the heart in a pericardial cradle throughout the course of the test procedure. Arterial pressure is monitored by inserting a polyethylene cannula into the aorta via the left carotid artery and is measured with an appropriate Statham pressure transducer. During the course of the experiment, electrical activity of the heart isd viewed both on an oscilloscope and recorded on a Sanborn polyviso using standard ECG lead II. The heart is also observed visually. The antiarrhythmic assay of the test drug is undertaken using a modification of the method of Scherf and Chick, 1951. A dripping of 1 percent solution of acetylcholine is applied to the sinus node and the atrium is irritated by pinching with a pair of forceps. This procedure produces a continuous artiral arrhythmia which mostly consists of atrial fibrillation. Since hypokalemia produces a susceptibility to atrial fibrillation (Leveque, 1964), 2 units/kg. of insulin is administered 30 minutes before the start of the acetylcholine drip. Once atrial fibrillation is established, there is a ten-minute waiting period before the test drug is administered. The test drugs are administered at the rate of 1 mg/kg/minute until noromal sinus rhythm appears or until 30 mg/kg. of drug is administered.

When 6'-methoxy-$\alpha$(R)-[5(R)-ethyl-4(S)-quinuclidin-2(S)-yl] 4'-quinoline methanol is utilized as the test substance at a dosage of about 4.0 mg/kg., an antifibrillatory effect is observed for more than 60 minutes.

Their pharmacological useful antimalarial activity is demonstrated in warm-blooded animals using standard procedures, for example, the test substance is administered to albino mice in variable amounts. Albino mice are inoculated with about 5–10 million red cells infected with P. Bergei. Treatment is started on the first day after inoculation, and the drug is administered "per os" during 4 consecutive days. On the seventh day of infection, smears are made, stained with giemsa and microscopically examined for P. Bergei.

Whwn racemic 7'-methoxy-dihydrocinchonidine dihydrochloride or racemic 7-methoxy-dihydrocinchonine dihydrochloride is utilized as the test substance at dosages in the range of 125 mg/kg. to about 250 mg/kg., the microscopical examination of the blood smears is free of P. Bergbei (negative). When 6'-methoxy-$\alpha$(R)-[5(R)-ethyl-4(S)-quinuclidin-2(S)-yl]-4-quinolinemethanol[dihydroquinine] or 6-methoxy-$\alpha$(R)-[5(R)-ethyl-4(S)-quinuclidin-2(S)-yl]-4-quinolinemethanol is utilized as the test substance at a dose of about 200 mg/kg., the microscopical examination of the blood smears is free of P. Berghei (negative). The compounds of formulas Ia, IIa, Iband IIb, including the compounds of formulas Ic, Id, IIc and IId, as well as compounds A and B, and their pharmaceutically acceptable acid addition salts have effects qualitatively similar, for example, to those of quinine and quinidine, known for their therapeutic uses and properties. Thus, the compounds of the invention demonstrate a pattern of activity associated with antimalarials and antiarrhythmics of known efficacy and safety.

Furthermore, the compounds of the formulas Ia, IIa, Ib and IIb, including the compounds of formulas Ic, Id, IIc and IId, as well as compounds A and B, can be utilized as flavoring agents in beverages in the same manner as quinine is now used for this purpose.

The compounds of formulas Ia, IIa and IIb, including the compounds of formulas Ic, Id, IIc and IId, as well as compounds A and B, for acid addition salts and such salts are also within the scope of this invention. Thus, the compounds of formulas Ia, IIa, Ib and IIb, including the compounds of formulas Ic, Id, IIc and IId, as well as compounds A and B, form pharmaceutically acceptable addition salts with, for example, both pharmaceutically acceptable addition salts with, for example, both pharmaceutically acceptable organic and inorganic acids, such as acetic acid, succinic acid, formic acid, methanesulfonic acid, p-toluenesulfonic acid, hydrochloric acid, nitric acid, phosphoric acid, sulfuric acid, and the like.

The products of the invention can be incorporated into standard pharmaceutical dosage forms, for example, they are useful for oral or parenteral application with the usual pharmaceutical adjuvant materials, e.g., organic or inorganic inert carrier materials such as water, gelatin, lactose, starch, magnesium stearate, talc, vegetable oils, gums, polyalkyleneglycols, and the like. The pharmaceutical preparations can be employed in a solid form, e.g., as tablets, troches, suppositories, capsules, or in liquid form, e.g., as solutions, suspensions or emulsions. The pharmaceutical adjuvant material can include preservatives, stabilizers, wetting or emulsifying agents, salts to change the osmotic pressure or to act as buffers. They can also contain other therapeutically active materials.

The quality of active medicament which is present in any of the above-described dosage forms is variable. The frequency with which any such dosage form will be administered will vary, depending upon the quantity of active medicament present therein, and the needs and requirements of the pharmacological situation.

Due to the possible different spatial arrangements of their atoms, it is to be understood that the compounds of this invention may be obtained in more than one possible stereoisomeric form. The novel compounds, as described and claimed, are intended to embrace all such isomeric forms. Accordingly, the examples included herein are to be understood as illustrative of particular mixtures of isomers or single isomers and not as limitations upon the scope of the invention. All temperatures are in degrees centrigrade, unless otherwise mentioned.

EXAMPLE 1

Preparation of 6-methoxy-4{3[1-benzoyl-3(R)-vinyl-4(S)-piperidyl]-2-oxopropyl}quinoline from 6-methoxy-lepidine and N-benzoyl meroquinene ethyl ester To a solution of ca. 0.07 mole of lithium diisopropyl amide [prepared by addition of 15 ml. of dry diisopropyl amine in 10 ml. of toluene to 35 ml. of ca. 2 molar n-butyl lithium in hexane, at −78° under nitrogen] was added dropwise (10 min.) with stirring a solution of 13 g. (0.075 mole) of 6-methoxy-lepidine in 120 ml. of tetrahydrofuran. The mixture was stirred at −78° for 30 min., and there was added dropwise (10 min.) a solution of 10.5 g. (0.0345 mole) of N-benzoylmeroguinene ethyl ester in 150 ml. of tetrahydrofuran. Stirring was continued at −78° for 30 min. The cooling bath was removed and the stirring was continued for another 30 min. Water was added, the aqueous layer was neutralized (pH ca. 8) with acetic and extracted thoroughly with ether. The ethereal phase was washed (water), dried (magnesium sulfate) and evaporated in vacuo. The residue was absorbed on 600 g. of neutral alumina, activity II; after elution of excess 6-methoxy-lepidine with benzene, elution with benzene-ethyl acetate (1:1) afforded amorphous 6-methoxy-4{3-[1-benzoyl-3(R)-vinyl-4(S)-piperidyl]-2-oxopropyl}-quinoline; $[\alpha]_D^{24}$ +27.3° (c 1.205; chloroform).

EXAMPLE 2

Preparation of 6-methoxy-4{-3-[1-benzoyl-3(R)-vinyl-4(S)-piperidyl]-2-oxopropyl}quinoline from 6-methoxylepidine and N-benzoyl-meroquinene methyl ester A condensation reaction carried out in analogous way as in Example 30a with 1.8 g. (0.0104 mole) of 6-methoxylepidine and 1.49 g. (0.0052 mole) of N-benzoyl-meroquinene methyl ester (phenyl lithium was used instead of N-butyl lithium) yielded after a similar technique and separation by column chromatography 6-methoxy-4{-3-[1-benzoyl-3(R)-vinyl-4(S)-piperidyl]-2-oxopropyl}-quinoline.

EXAMPLE 3

Preparation of epimeric 6-methoxy-4{3-[1-benzoyl-3(R)-vinyl-4(S)-piperidyl]-1ξ-bromo-2-oxopropyl}quinolines from 6-methoxy-4-{3-[1-benzoyl-3(R)-vinyl-4(S)-piperidyl]-2-oxopropyl}quinoline To a solution of 3.0 g. 6-methoxy-4-{3[1-benzoyl-3(R)-vinyl-4(S)-piperidyl]-2-oxopropyl} -quinoline in 300 ml. of dry carbontetrachloride in a 500 ml. pyrex flask was added 1.72 g. of solid N-bromosuccinimide and a few crystals of dibenzoylperoxide and the mixture was irradiated by means of a 250-watt IR heating lamp with stirring. After irradiation for 90 min., the refluxing mixture was cooled, filtered, the filter cake washed with carbontetrachloride, and the combined filtrates were evaporated to dryness to give 3.9 g. of a crude amorphous mixture of epimeric 6-methoxy-4-{3-[1-benzoyl-3(R)-vinyl-4(S)-piperidyl]-1ξ-bromo-2-oxopropyl}quinolines.

EXAMPLE 4

Preparation of diastereomeric 6-methoxy-4-{3-[1-benzoyl-3(R)-vinyl-4(S)-piperidyl]-1ξ-oxopropyl}quinolines from epimeric 6-methoxy-4-{3-[1-benzoyl-3(R)-vinyl-4(S)-piperidyl]-1ξ-bromo-2-oxopropyl}quinolines To a solution of 3.9 g. of the crude epimeric 6-methoxy-4-{3-[1-benzoyl-3(R)-vinyl-4(S)-piperidyl]-1ξ-bromo-2-oxopropyl}-quinolines in 300 ml. of methanol was added in excess of solid sodium borohydride. The solution was stirred at room temperature for 30 min., 50 ml. of water was added and stirring was continued for 12 hours. The methanol was evaporated, the aqueous residue was extracted thoroughly with dichloromethane and the organic extracts were washed (H₂O), dried (Na₂SO₄) and evaporated to give 2.7 g. of crude product which absorbed on 90 g. of neutral alumina, Activity II. Elution with benzene containing 10–50 percent of ethyl acetate afforded 1.4 g. (40 percent calculated on the basis of ketone) of an amorphous inseparable mixture of the diastereomeric 6-methoxy-4-{3-[1-benzoyl-3(R)-vinyl-4(S)-piperidl]-1ξ,2ξ-oxapropyl} quinolines; $[\alpha]_D^{25}$ +12.4° (c 1.33, chloroform).

EXAMPLE 5

Preparation of diastereomeric 6-methoxy-4-{3-[3(R)-vinyl-4(S)-piperidyl]-1ξ,2ξ-oxopropyl}quinolines from diastereomeric 6-methoxy-4-{3-[1-benzoyl-3(R)-vinyl-4(S)-piperidyl]-1ξ,2ξ-oxapropyl}-quinolines To a stirred dry ice-cold solution of 1.2 g. of diastereomeric 6-methoxy-4-{3-[1-benzoyl-3(R)-vinyl-4(S)-piperidyl]-1ξ,2ξ-oxopropyl}-quinolines in 100 ml. of dry toluene in an atmosphere of dry nitrogen was added 2 ml. of a ca. 1.5 molar solution of diisobutyl aluminum hydride in toluene. Stirring was continued for 45 min. at −78°, 5 ml. of methanol-water (1:1) was added and the mixture was stirred for 90 min. at 20°. The precipitate was filtered off, washed with methanol, and the combined filtrates were evaporated to dryness. The crude product (1.1 g.) was separated by preparative layer chromatography (silica gel $GF_{254}$; chloroform:-triethylamine:methanol 85:10:15) to give 0.578 g. (63 percent yield) of an amorphous inseparable mixture of the diastereomeric 6-methoxy-4-{3-[3(R)-vinyl-4(S)-piperidyl]-1ξ,2ξ-oxapropyl}quinolines.

EXAMPLE 6

Preparation of quinine, quinidine, epiquinine, epiquinidine from a mixture of diastereomeric 6-methoxy-4-{3-[3(R)-vinyl-4(S)-piperidyl]-1ξ,2ξ-oxapropyl}-quinolines A solution of 0.356 g. of diastereomeric 6-methoxy-4-{3-[3(R)-vinyl-4(S)-piperdyl]-1ξ,2ξ-oxapropyl}-quinolines in 50 ml. of toluene and 2 ml. of ethanol was heated under gentle reflux for 24 hours. The solvent was evaporated and the residue was separated by preparative thin layer chromatography to give: 0.49 g. of quinine [neutral (d)-tartrate: m.p. 207°–209°, dec. >200°; $[\alpha]_D^{25}$ −153.3° (c 0.90, methanol)]; 0.087 g. (24 percent) of quinidine [m.p. 171°–172°; $[\alpha]_D^{25}$ +256.0° (c 0.82, ethanol)]; 0.068 g. (18 percent) of epiquinine [neutral dibenzoyl-(d)-tartrate: m.p. 187°–189°; $[\alpha]_D^{25}$ +67.7° (c 0.93, ethanol-chloroform, 3:2)]; 0.065 g. (18 percent) of epiquinidine [neutral dibenzoyl-(d)-tartrate: m.p. 167°–168°; $[\alpha]_D^{25}$ +2.4° (c 0.90, ethanol-chloroform 4:1)].

Example 7
Tablet Formulation

| | Per Tablet |
|---|---|
| 6',7'-Dimethoxydihydrocinchonine | 25.00 mg. |
| Dicalcium Phosphate Dihydrate unmilled | 175.00 mg. |
| Corn Starch | 24.00 mg. |
| Magnesium Stearate | 1.00 mg. |
| Total Weight | 225.00 mg. |

Procedure:

25 Parts of racemic 6',7'-dimethoxydihydrocinchonine and 24 parts of corn starch were mixed together and passed through a No. 00 screen in Model "J" Fitzmill with hammers forward. This premix was then mixed with 175 parts of dicalcium phosphate and one-half part of magnesium stearate, passed through a No. 1A screen in Model "J" Fitzmill with knives forward, and slugged. The slugs were passed through a No. 2A plate in a Model "D" Fitzmill at slow speed with knives forward, and the remaining magnesium stearate was added. The mixture was mixed and compressed.

Example 8
Capsule Formulation

| | Per Capsule |
|---|---|
| 6',7'-Dimethoxydihydrocinchonine | 50 mg. |
| Corn Starch, U.S.P. | 150 mg. |
| Talc, U.S.P. | 10 mg. |
| Total Weight | 210 mg. |

Procedure:

Fifty parts of racemic 6',7'-dimethoxy-dihydrocinchonine were mixed with 150 parts of corn starch in a suitable mixer. The mixture was further blended by passing through a Fitzpatrick Communicating Machine with a No. 1A screen with knives forward. The blended powder was returned to the mixer and 10 parts of talc were added and blended thoroughly. The mixture was filled into No. 4 hard shell gelatin capsules on a Parke Davis capsulating machine.

Example 9
Suppository Formulation

| | Per 1.3 Gm. Suppository |
|---|---|
| 6',7'-Dimethoxydihydrocinchonidine | 0.025 gm. |
| Hydrogenated Coconut Oil | 1.230 gm. |
| Carnauba Wax | 0.045 gm. |

Procedure:

123 Parts of hydrogenated coconut oil (Wecobee M-E. F. Drew Co., New York, New York) and 4.5 parts of carnauba wax were melted in a suitable size glass lined container (stainless steel may also be used), mixed well and cooled to 45°C. 2.5 Parts of 6',7'-dimethoxy-dihydrocinchonidine, which had been reduced to a fine powder with no lumps, was added and stirred until completely and uniformly dispersed. The mixture was poured into suppository molds to yield suppositories having an individual weight of 1.3 gms. The suppositories were cooled and removed from molds and individually wrapped in wax paper for packaging.

What is claimed is:

1. A process for preparing compounds of the formulas

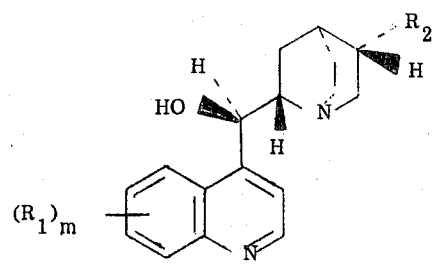

and

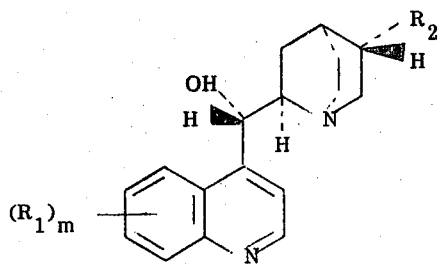

wherein *m* is 0, 1 or 2; $R_1$ is hydrogen, hydroxy, chloro, trifluoromethyl, methyl, methoxy, ethyl, propyl or butyl, or when *m* is 2, $R_1$, taken together with an adjacent $R_1$, is also methylenedioxy; and $R_2$ is vinyl or ethyl; their antipodes and racemates, comprising the step of treating a compound of the formula

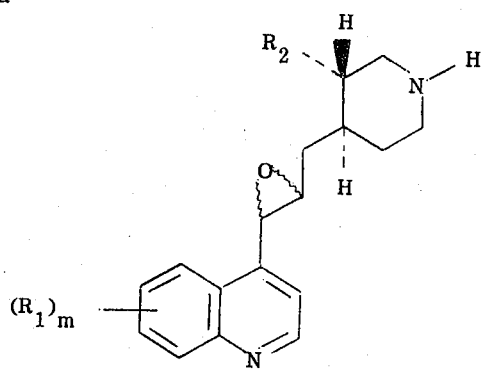

wherein $R_1$, $R_2$ and *m* are as above its antipode and racemate
with a weak organic or inorganic protonic acid selected from the group consisting of water, ammonium chloride, lower alkanols and Lewis acids.

2. A process for preparing compounds of the formulas

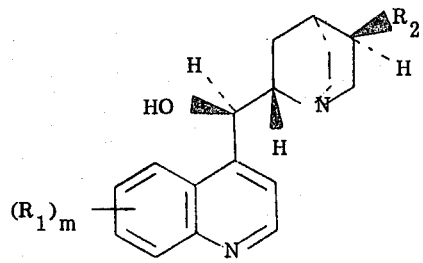

and

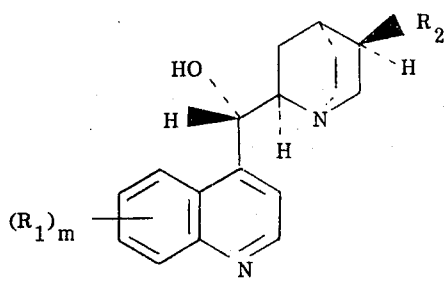

wherein *m* is 0, 1 or 2; $R_1$ is hydrogen, hydroxy, chloro, trifluoromethyl, methyl, methoxy, ethyl, propyl or butyl or when *m* is 2, $R_1$, taken together with an adjacent $R_1$, is also methylenedioxy; and $R_2$ is vinyl or ethyl; their antipodes and racemates, comprising the step of treating a compound of the formula

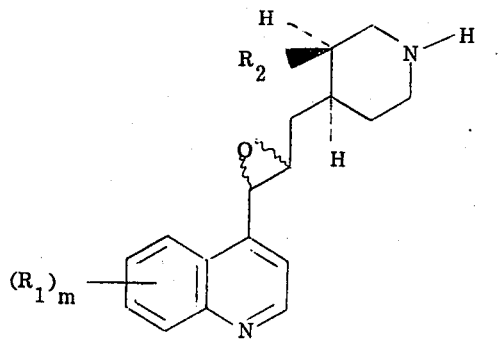

wherein $R_1$, $R_2$ and *m* are as above its antipode or racemate
with a weak organic or inorganic protonic acid selected from the group consisting of water, ammonium chloride, lower alkanols and Lewis acids.

* * * * *

UNITED STATES PATENT OFFICE
CERTIFICATE OF CORRECTION

PATENT NO. : 3,869,462
DATED : March 4, 1975
INVENTOR(S) : Juerg Albert Walter Gutzwiller & Milan Radoje Uskokovic It is certified that error appears in the above-identified patent and that said Letters Patent are hereby corrected as shown below:

In the "Related U.S. Application Data" - [60] -

Ser. No. 164,784 should be:

104,784

Signed and Sealed this seventh Day of October 1975

[SEAL]

Attest:

RUTH C. MASON
Attesting Officer

C. MARSHALL DANN
Commissioner of Patents and Trademarks